United States Patent
Xiao

(10) Patent No.: US 12,518,789 B2
(45) Date of Patent: Jan. 6, 2026

(54) DATA STORAGE DEVICE WITH SELF-LEARNING OSCILLATION DETECTOR

(71) Applicant: WESTERN DIGITAL TECHNOLOGIES, INC., San Jose, CA (US)

(72) Inventor: Sandy Xianghui Xiao, San Diego, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 160 days.

(21) Appl. No.: 18/516,481

(22) Filed: Nov. 21, 2023

(65) Prior Publication Data
US 2025/0166662 A1    May 22, 2025

(51) Int. Cl.
| | | |
|---|---|---|
| *G11B 19/14* | (2006.01) | |
| *G11B 5/55* | (2006.01) | |
| *G11B 5/596* | (2006.01) | |
| *G11B 19/04* | (2006.01) | |
| *G11B 21/02* | (2006.01) | |

(52) U.S. Cl.
CPC .............. *G11B 19/14* (2013.01); *G11B 5/556* (2013.01); *G11B 5/59694* (2013.01); *G11B 19/042* (2013.01); *G11B 21/02* (2013.01)

(58) Field of Classification Search
None
See application file for complete search history.

(56) References Cited

U.S. PATENT DOCUMENTS

| | | | |
|---|---|---|---|
| 6,111,826 A * | 8/2000 | Minase | G11B 19/04 369/53.18 |
| 6,141,175 A | 10/2000 | Nazarian et al. | |
| 6,222,336 B1 * | 4/2001 | McKenzie et al. | G11B 33/08 369/239 |
| 6,437,936 B1 | 8/2002 | Chen et al. | |
| 6,643,084 B1 | 11/2003 | Andrew et al. | |
| 10,475,478 B2 | 11/2019 | Tagami | |
| 10,770,111 B1 | 9/2020 | Zayas | |
| 2002/0034036 A1 | 3/2002 | Sri-Jayantha et al. | |
| 2002/0126412 A1 | 9/2002 | Shibata | |

(Continued)

FOREIGN PATENT DOCUMENTS

JP    2003338146 A    11/2003

OTHER PUBLICATIONS

S. Wu et al., "Repeatable runout compensation for hard disk drives using adaptive feedforward cancellation." In 2006 American Control Conference, Jun. 2006, 6 pages.

*Primary Examiner* — Craig A. Renner
(74) *Attorney, Agent, or Firm* — Calderon Safran & Wright P.C.

(57) ABSTRACT

Various illustrative aspects are directed to a data storage device, method, and one or more processing devices that are configured to: generate an expected oscillation spectrum associated with a band of the selected disk; detect oscillation abnormality of the selected head based on comparing an actual oscillation spectrum associated with a data sector in the band to the expected oscillation spectrum associated with the band, wherein the data sector includes data written by the selected head; and perform a remediation action in response to detecting oscillation abnormality of the selected head.

20 Claims, 7 Drawing Sheets

(56) References Cited

U.S. PATENT DOCUMENTS

| | | |
|---|---|---|
| 2003/0133218 A1 | 7/2003 | Guo et al. |
| 2006/0238912 A1 | 10/2006 | Kumano |
| 2011/0085260 A1* | 4/2011 | Wada et al. .......... G11B 19/042 |
| | | 360/75 |
| 2015/0302876 A1 | 10/2015 | Kashiwagi et al. |

* cited by examiner

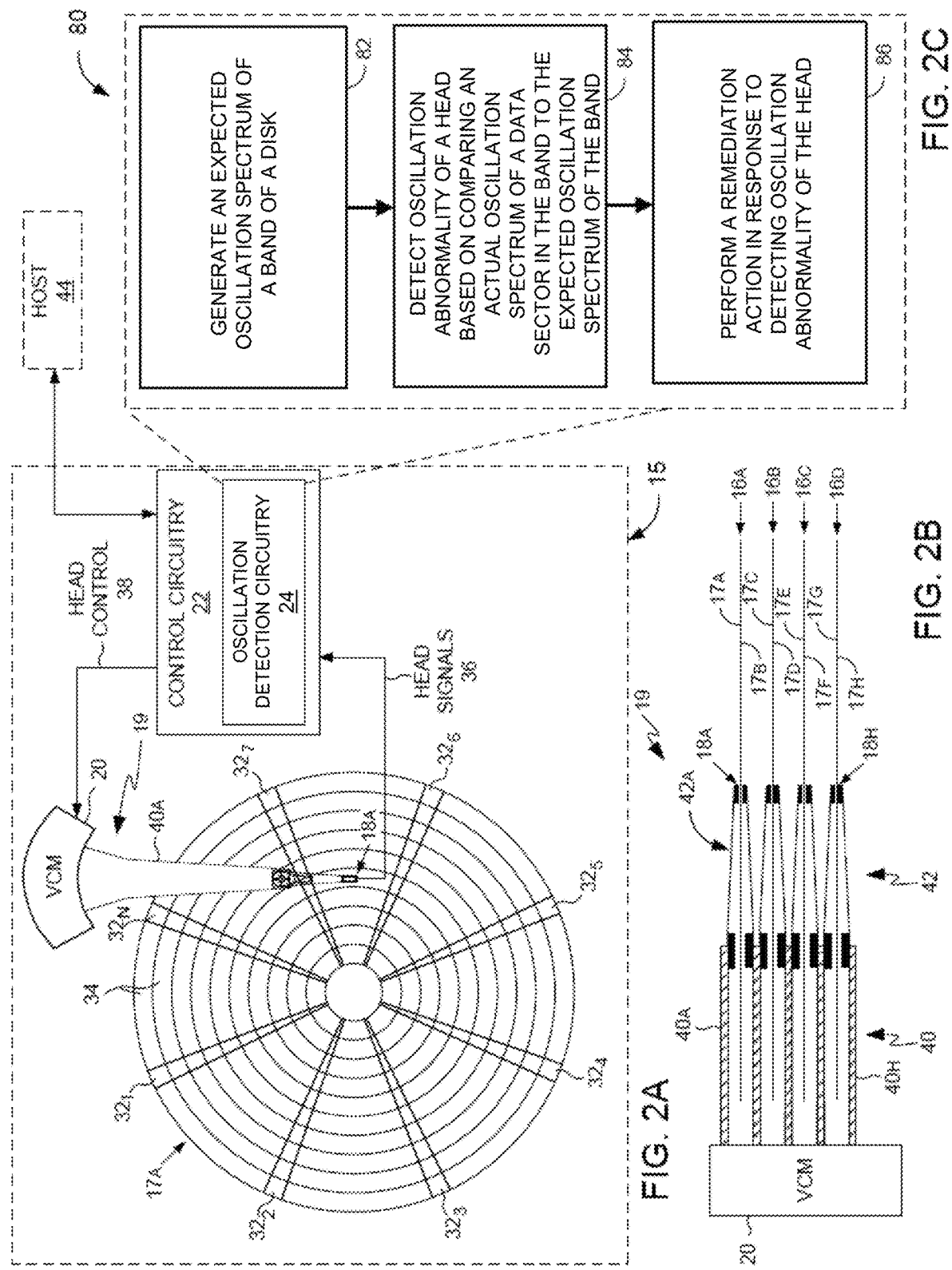

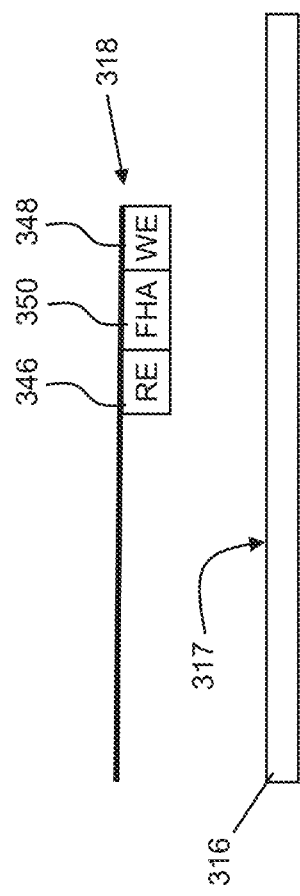
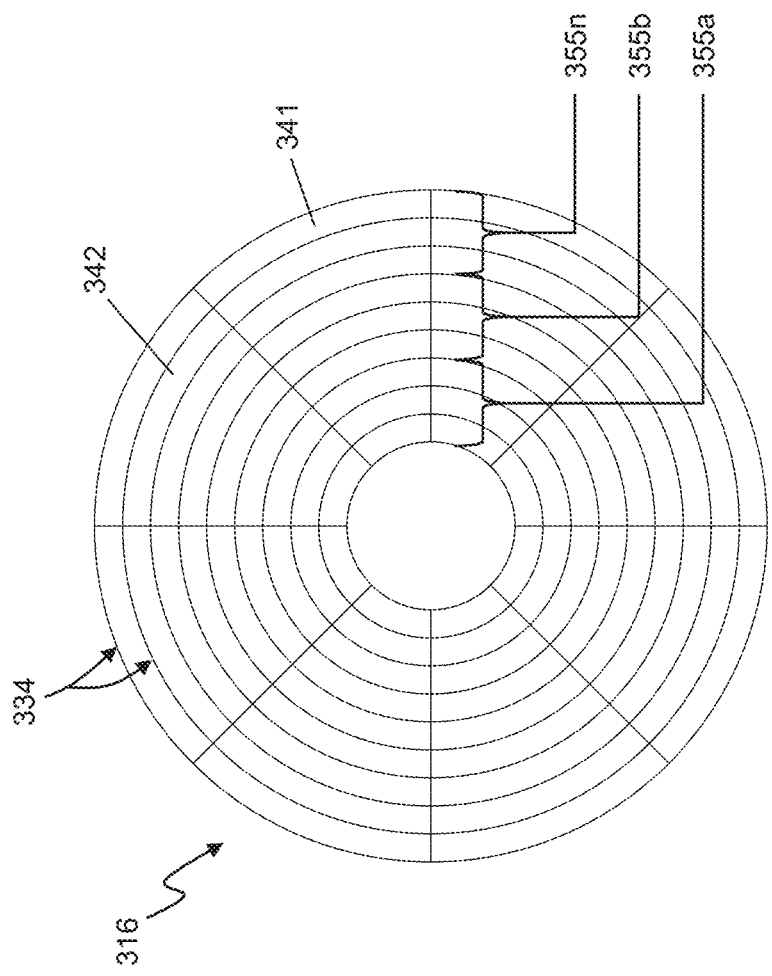
FIG. 3A
FIG. 3B

DATA STORAGE DEVICE WITH SELF-LEARNING OSCILLATION DETECTOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive methods of detecting abnormal vertical oscillation (also referred to herein as oscillation abnormality) in one or more heads of a disk drive. In various examples, control circuitry of this disclosure is inventively configured to detect oscillation abnormality of a head based on comparing an actual oscillation spectrum associated with a read signal of a data sector to an expected oscillation spectrum of a read signal of a band including the data sector.

Various illustrative aspects are directed to a data storage device comprising: one or more disks; an actuator mechanism configured to position a selected head among one or more heads proximate to a corresponding disk surface of a selected disk among the one or more disks; and one or more processing devices. The one or more processing devices, individually or in combination, are configured to: generate an expected oscillation spectrum associated with a band of the selected disk; detect oscillation abnormality of the selected head based on comparing an actual oscillation spectrum associated with a data sector in the band to the expected oscillation spectrum associated with the band, wherein the data sector includes data written by the selected head; and perform a remediation action in response to detecting oscillation abnormality of the selected head.

Various illustrative aspects are directed to a method comprising: generating an expected oscillation spectrum associated with a band of a selected disk in a disk drive; detecting oscillation abnormality of a selected head in the disk drive based on comparing an actual oscillation spectrum associated with a data sector in the band to the expected oscillation spectrum associated with the band, wherein the data sector includes data written by the selected head; and performing a remediation action in response to detecting oscillation abnormality of the selected head, wherein the generating the expected oscillation spectrum, the detecting oscillation abnormality of the selected head, and the performing the remediation action are performed by one or more processing devices individually or in combination.

Various illustrative aspects are directed to one or more processing devices comprising: means for generating and updating an expected oscillation spectrum associated with a band of a selected disk in a disk drive; means for detecting oscillation abnormality of a selected head in the disk drive based on comparing an actual oscillation spectrum associated with a data sector in the band to the expected oscillation spectrum associated with the band, wherein the data sector includes data written by the selected head; and means for performing a remediation action in response to detecting oscillation abnormality of the selected head.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that control circuitry of a disk drive may perform or execute in controlling the operations of the disk drive, in accordance with aspects of the present disclosure.

FIG. 3A depicts a head relative to a disk in accordance with various aspects of this disclosure.

FIG. 3B depicts bands of a disk in accordance with aspects of the present disclosure.

DETAILED DESCRIPTION

Figure 1:
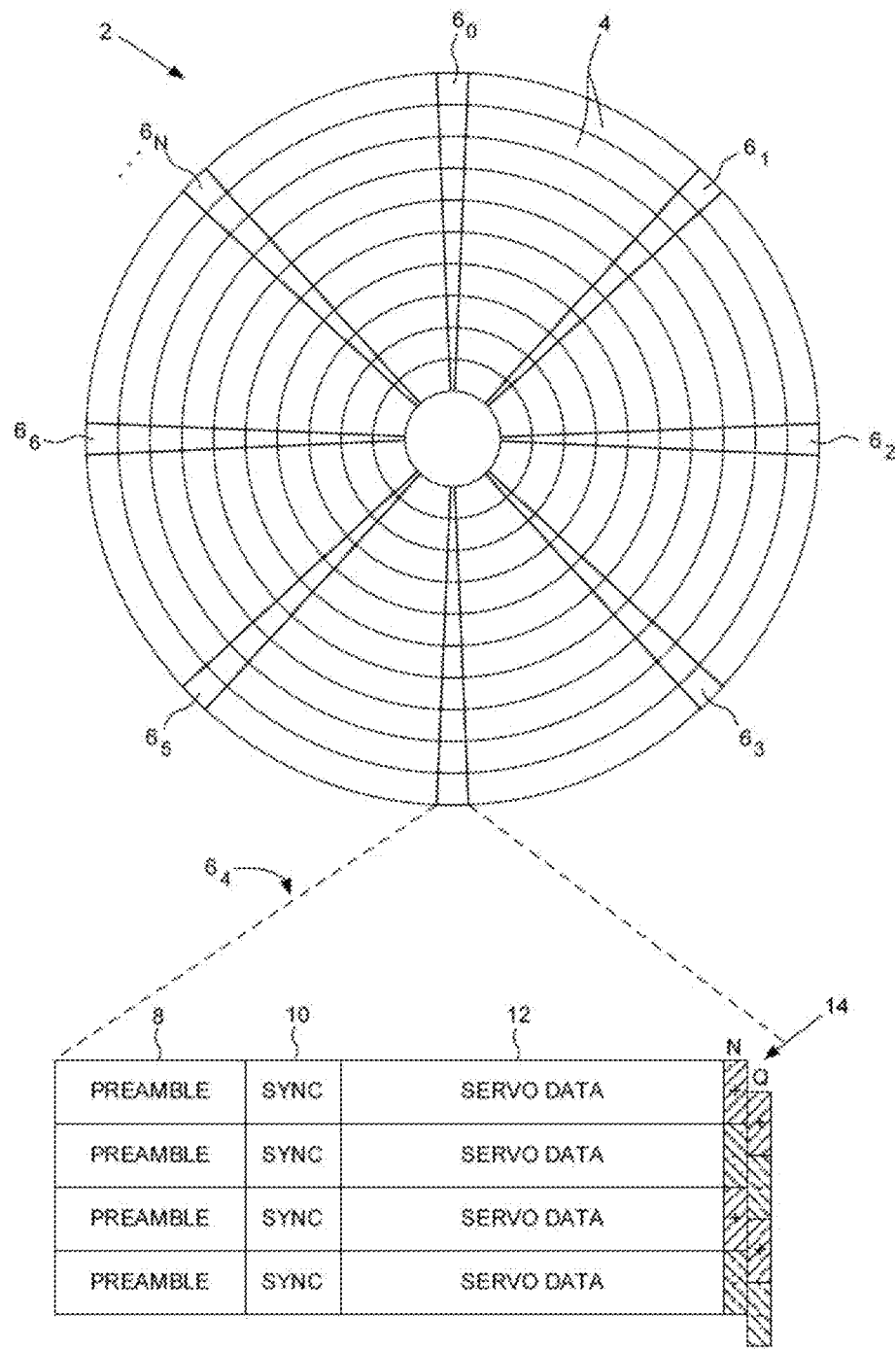
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that oscillation detection circuitry 24 of control circuitry 22 may perform or execute in controlling the operations of disk drive 15, in accordance with aspects of the present disclosure, including detecting abnormal vertical oscillation of a head of a disk drive and performing a remediation action in response to such detecting.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, oscillation detection circuitry 24 of control circuitry 22 may generate an expected oscillation spectrum of a band of a disk (82). Oscillation detection circuitry 24 may further detect oscillation abnormality of a head based on comparing an actual oscillation spectrum of a data sector in the band to the expected oscillation spectrum of the band (84). Oscillation detection circuitry 24 may further perform a remediation action in response to detecting oscillation abnormality of the head (86). Control circuitry 22, including oscillation detection circuitry 24, may further perform additional actions, methods, and techniques, in accordance with various aspects including as further described herein.

The term "oscillation detection circuitry 24" as used herein may refer to any hardware, firmware, software, and/or combination thereof, comprised in control circuitry 22 of disk drive 15, which implements, embodies, or engages in any of the structures or functions ascribed herein to oscillation detection circuitry 24 or to any other of the novel and inventive aspects of the present disclosure. Oscillation detection circuitry 24 may constitute any hardware, firmware, software, and/or any other elements of control circuitry 22 for detecting oscillation abnormality of a head based on comparing an actual oscillation spectrum associated with a read signal of a data sector to an expected oscillation spectrum of a read signal of a band including the data sector, and performing other techniques and methods as described herein.

One of the challenges of writing user data to a disk (such as one of disks 16) is to write the user data with a smallest possible amount of noise. A disk drive (such as disk drive 15) may abort a write operation in response to a servo system of the disk drive detecting a sufficiently large offtrack condition or in response to detecting vertical oscillation of a head (such as one of heads 18) via a response of a temperature sensor in the head. When such conditions are detected, the disk drive may perform write recovery steps in order to complete the write of the user data. However, performing such write recovery steps has an undesirable cost in terms of both time and drive performance. Due to the time and performance costs of performing write recovery steps, the criteria for detecting these conditions are typically configured in a manner that results in the conditions being detected less frequently. This under-inclusiveness results in some writes being completed without performing write recovery steps even though these writes are impacted by noise from head oscillation. Sectors of a disk that are written in this manner (i.e., impacted by noise from head oscillation but write recovery steps not performed) are at risk of becoming unrecoverable due to natural media decay on the disk or slight adjacent track written interference.

Vertical oscillation of a head of a disk drive can be caused by a number of factors including but not limited to: a smear on the head; contamination of the disk surface over which the head passes; and unintended mechanical shift of the head from an initial position. In practice, vertical oscillation of a head can have different frequencies ranging from low frequency (e.g., less than 30 KHz) to high frequency (e.g., greater than 30 KHz). Low frequency oscillation of a head can be detected using servo patterns on a disk or a temperature sensor in the head. However, due to low sampling rates associated with servo patterns, a disk drive cannot use servo patterns to detect high frequency oscillation of the head. Similarly, because of the temperature sensor time constant and inaccuracies due to factors such as temperature and contamination, a disk drive cannot use the temperature sensor in the head to detect high frequency oscillation of the head.

Implementations of the present disclosure address the aforementioned issues by providing a data storage device, method, and one or more processing devices that are configured to detect abnormal vertical oscillation of a head of a disk drive using frequency analysis of read element output signals from reads of user data written at different bands of a disk. Embodiments leverage high frequency characteristics of the read element and user data, combined with frequency analysis of output signals of the read element, to detect conditions indicating that abnormal vertical oscillation of a head of the disk drive occurred during a write process. Embodiments may be configured to perform one or more remediation actions in response to detecting conditions indicating abnormal vertical oscillation of a head.

Implementations of the present disclosure are configured to read user data from a data sector of a disk using a read element in a head, and to compare an actual frequency spectrum of an output signal of the read element to an expected frequency spectrum of an output signal of the read element associated with a band of the disk that contains the data sector. Embodiments may be configured to determine that the head experienced abnormal vertical oscillation (i.e., oscillation abnormality) when writing the user data to the data sector based on comparing the actual frequency spectrum of the output signal of the read element to the expected frequency spectrum of the output signal of the read element for the band of the disk that contains the data sector. In various embodiments, abnormal vertical oscillation (i.e., oscillation abnormality) of a head refers to an amount of vertical oscillation that exceeds a threshold amount. In various embodiments, the threshold amount is a configurable value that may be defined by a user so that the user may tailor operation of the disk drive to a desired specification.

FIG. 3A depicts a head relative to a disk in accordance with various aspects of this disclosure. In particular, FIG. 3A shows a disk 316 that corresponds to one of disks 16 of FIG. 2B and a head 318 that corresponds to one of heads 18 of FIG. 2B. In embodiments, head 318 includes a read element 346 (e.g., a magnetoresistive (MR) element), a write element 348 (e.g., an inductive write coil), and a fly height actuator 350 (e.g., a thermal or piezoelectric element). Control circuitry 22 (shown in FIG. 2A) writes data to disk surface 317 by modulating a write current in an inductive write coil in write element 348, to record magnetic transitions onto corresponding disk surface 317 in a process referred to as saturation recording. During readback, read element 346 senses the magnetic transitions, and a read channel demodulates the resulting read signal. Control circuitry may use fly height actuator 350 to induce changes in the fly height of head 318 above disk surface 317. Although not shown, head 318 may include other elements, such as a laser diode, waveguide, and near-field transducer, for example, in a heat-assisted magnetic recording (HAMR) disk drive.

FIG. 3B depicts bands of a disk in accordance with aspects of the present disclosure. In particular, FIG. 3B shows disk 316 including a plurality of concentric tracks 334 each divided into plural data sectors (e.g., 341, 342, and others not numbered) for recording user data. Although not shown, each of the tracks 334 may also include plural servo sectors that contain servo information such as that described with respect to servo wedges $6_i$ of FIG. 1. In embodiments, oscillation detection circuitry 24 of control circuitry 22 defines bands 355a, 355b, . . . , 355n of each disk 316, where each respective band 355a-n comprises a unique set of one or more tracks 334 of the disk. Each disk surface may comprise plural tracks grouped into plural respective bands, such that each head may be associated with the plural respective bands of its associated disk surface. In the example shown in FIG. 3B, data sectors 341 and 342 are included in band 355n.

In accordance with aspects of the present disclosure, oscillation detection circuitry 24 generates a respective baseline oscillation spectrum for each respective band of each disk in the disk drive. In the example of FIG. 3B, oscillation detection circuitry 24 generates a baseline oscillation spectrum for band 355a, another baseline oscillation spectrum for band 355b, and another baseline oscillation spectrum for band 355n. In this manner, each band 355a-n is associated with a unique baseline oscillation spectrum. In embodiments, oscillation detection circuitry 24 generates the baseline oscillation spectrum for a band during a manufacturing test process. The manufacturing test process may include writing test data to data sectors in the band using the write element 348 of the head 318, reading the test data using the read element 346 of the same head 318, and performing a frequency analysis (e.g., such as a power spectrum analysis) of samples of the output signal of the read element 346 generated when reading the test data. The baseline oscillation spectrum for a band may be generated in this manner based on reading test data from some or all the data sectors in the band.

In accordance with aspects of the present disclosure, oscillation detection circuitry 24 generates a respective expected oscillation spectrum for each respective band of each disk in the disk drive. In the example of FIG. 3B, oscillation detection circuitry 24 generates an expected oscillation spectrum for band 355a, another expected oscillation spectrum for band 355b, and another expected oscillation spectrum for band 355n. In this manner, each band 355a-n is associated with a unique expected oscillation spectrum. In embodiments, oscillation detection circuitry 24 generates an expected oscillation spectrum for a band based on the baseline oscillation spectrum for the band and output signals of the read element that are generated when reading user data written to (i.e., stored in) data sectors in the band. In embodiments, oscillation detection circuitry 24 identifies good read sectors among the data sectors in a band, reads user data in the good read sectors using the read element 346, combines samples of the output signal of the read element 346 generated when reading the user data in the good read sectors with the previously obtained samples of the output signal of the read element 346 generated when reading the test data, and performs a frequency analysis (e.g., such as a power spectrum analysis) of the combined samples. In this manner, oscillation detection circuitry 24 adapts the initially created baseline oscillation spectrum for a band based on subsequently reading user data in good read sectors of the band, thereby generating and updating the expected oscillation spectrum for the band on the fly as more user data is read from good read sectors in the band. In this manner, oscillation detection circuitry 24 provides a self-learning mechanism for continuously updating the expected oscillation spectrum for the band.

In embodiments, oscillation detection circuitry 24 identifies good read sectors in a band using criteria including one or more of error rate, error recovery needed, and amount of error correction effort. In one example, error rate corresponds to symbol error rate, and oscillation detection circuitry 24 identifies as a good read sector any sector that has a symbol error rate less than −2 dB. In another example, oscillation detection circuitry 24 identifies as a good read sector any sector that does not need any error recovery steps. In another example, oscillation detection circuitry 24 identifies as a good read sector any sector that has minimum error correction effort as defined, for example, by per sector global and local iteration times.

Figure 4:
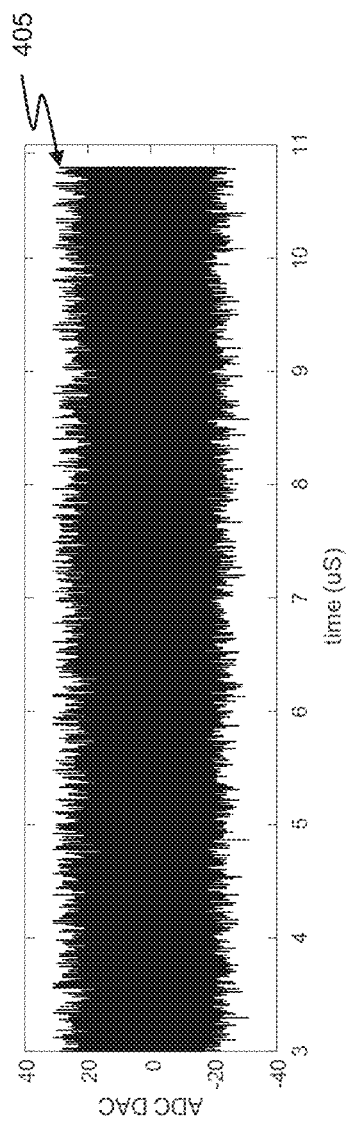
FIG. 4 shows an exemplary output signal of a read element generated when reading user data in a good read sector in accordance with aspects of the present disclosure.

FIG. 4 shows an exemplary output signal 405 of a read element (e.g., read element 346) generated when reading user data in a good read sector (e.g., data sector 341) in accordance with aspects of the present disclosure. The horizontal axis in FIG. 4 represents time in microseconds, and the vertical axis represents a magnitude of an output of an analog to digital converter (ADC) of the read element.

Figure 5:
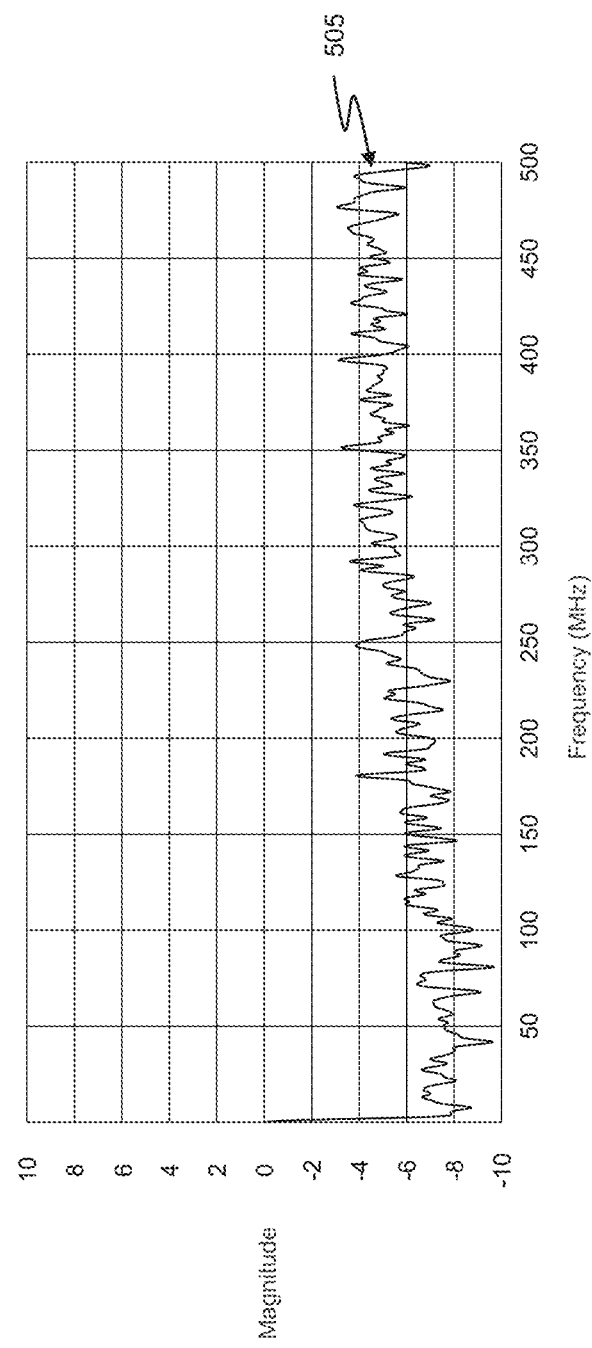
FIG. 5 shows an exemplary expected oscillation spectrum for a band in accordance with aspects of the present disclosure.

FIG. 5 shows an exemplary expected oscillation spectrum 505 for a band (e.g., band 355n) in accordance with aspects of the present disclosure. The horizontal axis in FIG. 5 represents frequency in MHz, and the vertical axis represents magnitude of frequency components of the analyzed samples. The expected oscillation spectrum 505 may be generated as described herein by performing a frequency analysis (e.g., such as a power spectrum analysis) on a set of samples of output signals generated by the read element when reading user data in good read sectors. The set of samples may also include samples of output signals generated by the read element when reading test data as described herein. The expected oscillation spectrum 505 thus shows expected magnitudes of frequency components of the output signal of a read element of a head for a particular band of a disk in the disk drive. In embodiments, and as described above, oscillation detection circuitry 24 may be configured to continuously update the expected oscillation spectrum for a band in a self-learning manner by updating a set of samples for the band (i.e., by adding new samples to the existing set of samples for the band) and re-running the frequency analysis using the updated set of samples, where the new samples include samples of output signals generated by the read element when reading user data in newly identified good read sectors.

In accordance with aspects of the present disclosure, in response to writing user data in a sector, oscillation detection circuitry 24 generates an actual oscillation spectrum for the data sector and compares the actual oscillation spectrum for the data sector to the expected oscillation spectrum for the band that contains the data sector. For example, after writing user data in data sector 342 of FIG. 3B, oscillation detection circuitry 24 generates an actual oscillation spectrum for data sector 342 and compares this actual oscillation spectrum for data sector 342 to the expected oscillation spectrum for the band 355n that contains data sector 342. In embodiments, oscillation detection circuitry 24 generates the actual oscillation spectrum for a data sector by reading user data in the data sector using the read element 346, and performing a frequency analysis (e.g., a power spectrum analysis) on samples of the output signal generated by the read element when reading the user data in the data sector.

In embodiments, oscillation detection circuitry 24 generates a respective actual oscillation spectrum for each of a predefined number of the most recently written data sectors in a band. Moreover, in addition to the predefined number of the most recently written data sectors in a band, oscillation detection circuitry 24 may be configured to generate a respective actual oscillation spectrum for any data sector that is identified as a bad read sector. In embodiments, oscillation detection circuitry 24 identifies bad read sectors using criteria including one or more of extended error recovery and write/read verification. In one example, oscillation detection circuitry 24 identifies as a bad read sector any sector that requires more than a threshold number of error recovery steps to perform the read. In another example, oscillation detection circuitry 24 identifies as a bad read sector any sector that requires read after write verification.

Figure 6:
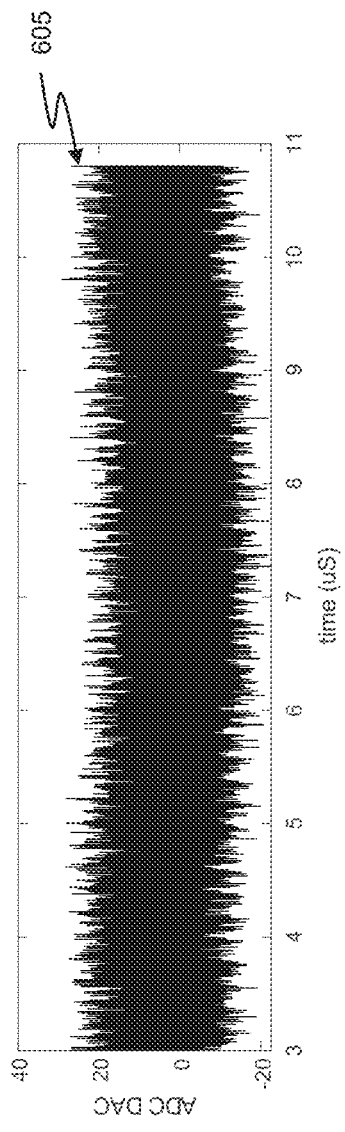
FIG. 6 shows an exemplary output signal of a read element generated when reading user data in a data sector in accordance with aspects of the present disclosure.

FIG. 6 shows an exemplary output signal 605 of a read element (e.g., read element 346) generated when reading user data in a data sector (e.g., data sector 342) in accordance with aspects of the present disclosure. The horizontal axis in FIG. 6 represents time in microseconds, and the vertical axis represents a magnitude of an output of an analog to digital converter (ADC) of the read element.

Figure 7:
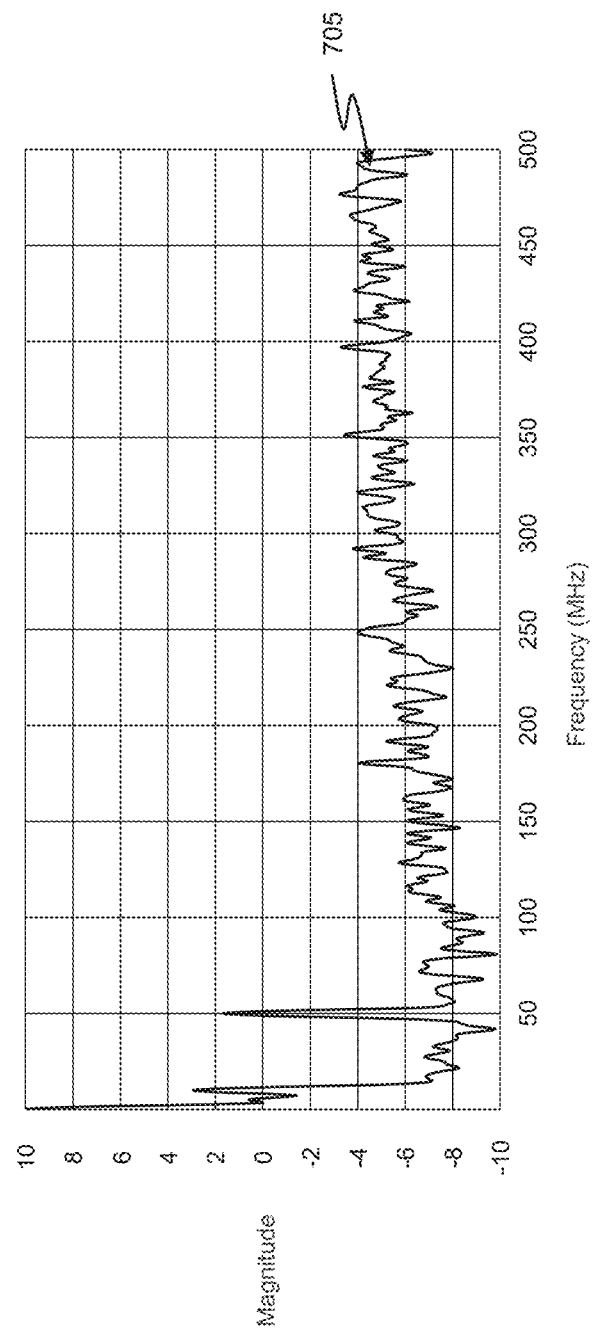
FIG. 7 shows an exemplary actual oscillation spectrum for a data sector in accordance with aspects of the present disclosure.

FIG. 7 shows an exemplary actual oscillation spectrum 705 for a data sector (e.g., data sector 342) in accordance with aspects of the present disclosure. The horizontal axis in FIG. 7 represents frequency in MHz, and the vertical axis represents magnitude of frequency components of the analyzed samples. The actual oscillation spectrum 705 may be generated as described herein by performing a frequency analysis (e.g., such as a power spectrum analysis) on a set of samples of output signals generated by the read element when reading user data in a data sector (e.g., data sector 342).

Figure 8:
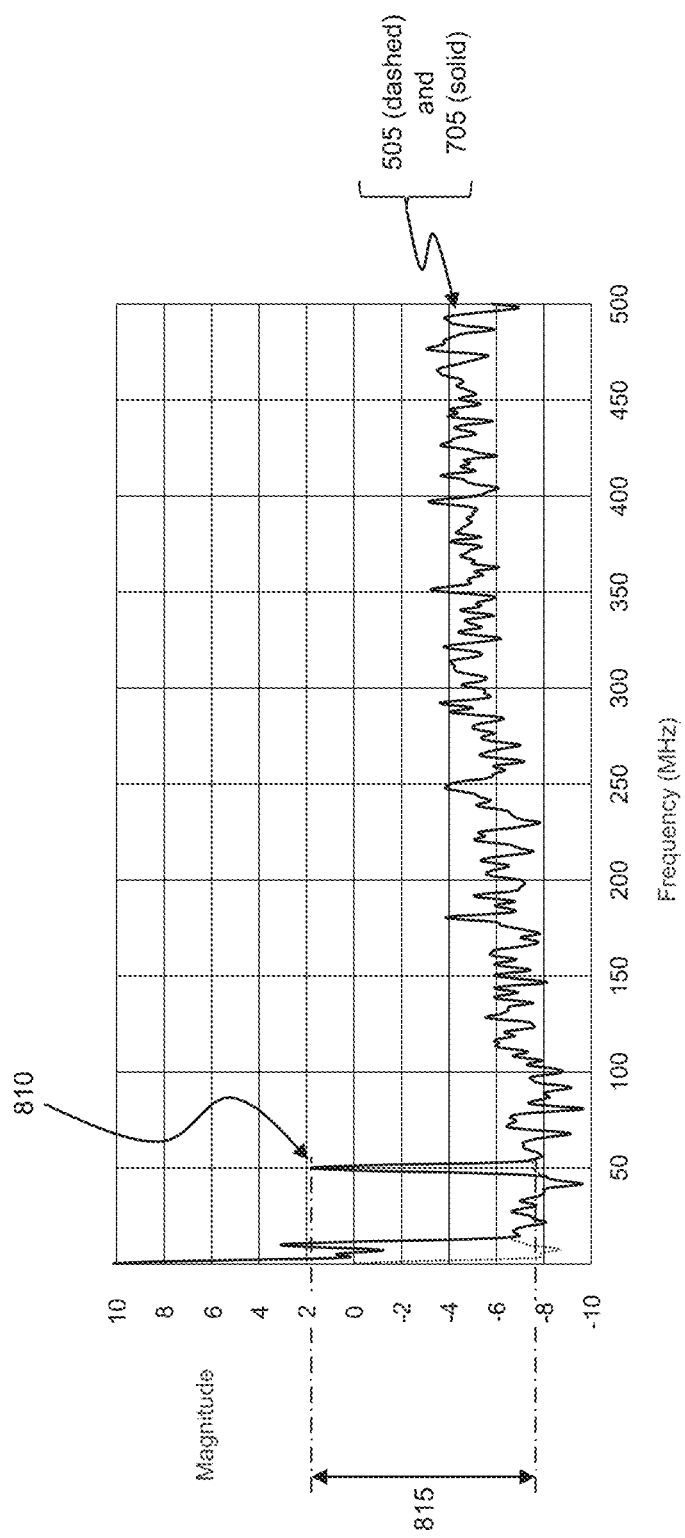
FIG. 8 shows a comparison of expected oscillation spectrum for a band with actual oscillation spectrum for a data sector in accordance with aspects of the present disclosure.

FIG. 8 shows a comparison of expected oscillation spectrum 505 for a band (e.g., band 355n) with actual oscillation spectrum 705 for a data sector (e.g., data sector 342) in accordance with aspects of the present disclosure. In embodiments, and as described herein, oscillation detection circuitry 24 compares the actual oscillation spectrum for a data sector to the expected oscillation spectrum for a band that contains the data sector for the purpose of identifying any significant deviations of the actual oscillation spectrum relative to the expected oscillation spectrum. In the example shown in FIG. 8, actual oscillation spectrum 705 includes a spike 810 at a frequency of 50 MHZ that differs by amount 815 from the magnitude of the expected oscillation spectrum 505 at the same frequency. In embodiments, in response to amount 815 being greater than a threshold amount, oscillation detection circuitry 24 determines that the head (e.g., head 318) experienced abnormal vertical oscillation when writing the user data to the data sector (e.g., data sector 342). In embodiments, the threshold amount may be a user-configurable setting. In this manner, oscillation detection circuitry 24 may be configured to detect abnormal oscillation of a selected head by determining that a frequency component of the actual oscillation spectrum is greater than a corresponding frequency component of the expected oscillation spectrum by more than a threshold amount.

In accordance with aspects of the present disclosure, oscillation detection circuitry 24 performs one or more remediation actions in response to detecting abnormal oscillation based on comparing an actual oscillation spectrum for a data sector to an expected oscillation spectrum for a band containing the data sector. Non-limiting examples of remediation actions include: adjusting a fly height of the head when the head is traveling over a particular band; reallocating user data from a first band to a second band; performing a smear removal action; performing a head depopulation action; and providing a notification to a user.

In embodiments, in response to detecting abnormal oscillation in the manner described herein at plural data sectors in a single band, oscillation detection circuitry 24 may be configured to adjust the fly height of the head when the head is traveling over this particular band or reallocate user data from this particular band to another band. Detecting abnormal oscillation at plural data sectors in a single band may be indicative of a contamination on the disk surface at a location in the band. In one example, oscillation detection circuitry 24 may be configured to adjust the fly height of the head (e.g., using fly height actuator 350) to a height greater than a nominal fly height, so that the head avoids the contamination when travelling over this band. In another example, if fly height adjustment does not resolve the abnormal oscillation, oscillation detection circuitry 24 may be configured to reallocate (i.e., move) the user data from this band to another band on this disk or another disk.

In embodiments, in response to detecting abnormal oscillation in the manner described herein at plural data sectors in plural bands with the same head, oscillation detection circuitry 24 may be configured to perform a smear removal action or perform a head depopulation action. Detecting abnormal oscillation with a same head across plural different bands may be indicative of a smear on the head. In one example, oscillation detection circuitry 24 may be configured to perform a smear removal action to attempt to eliminate or dislodge the smear. Any suitable conventional or later-developed smear removal action may be used. In another example, oscillation detection circuitry 24 may be configured to perform a head depopulation action (also called a head depop) in which the head is classified (e.g., to a system controller) as ineligible for use in further operations and thus effectively disabled from further use/operation.

In embodiments, in response to detecting abnormal oscillation in the manner described herein with plural heads of the disk drive, oscillation detection circuitry 24 may be configured to provide a notification to a user. Detecting abnormal oscillation at plural different heads may be indicative of a severe issue with the disk drive. In this situation, oscillation detection circuitry 24 may be configured to notify a user to consider replacing the disk drive, for example.

Figure 9:
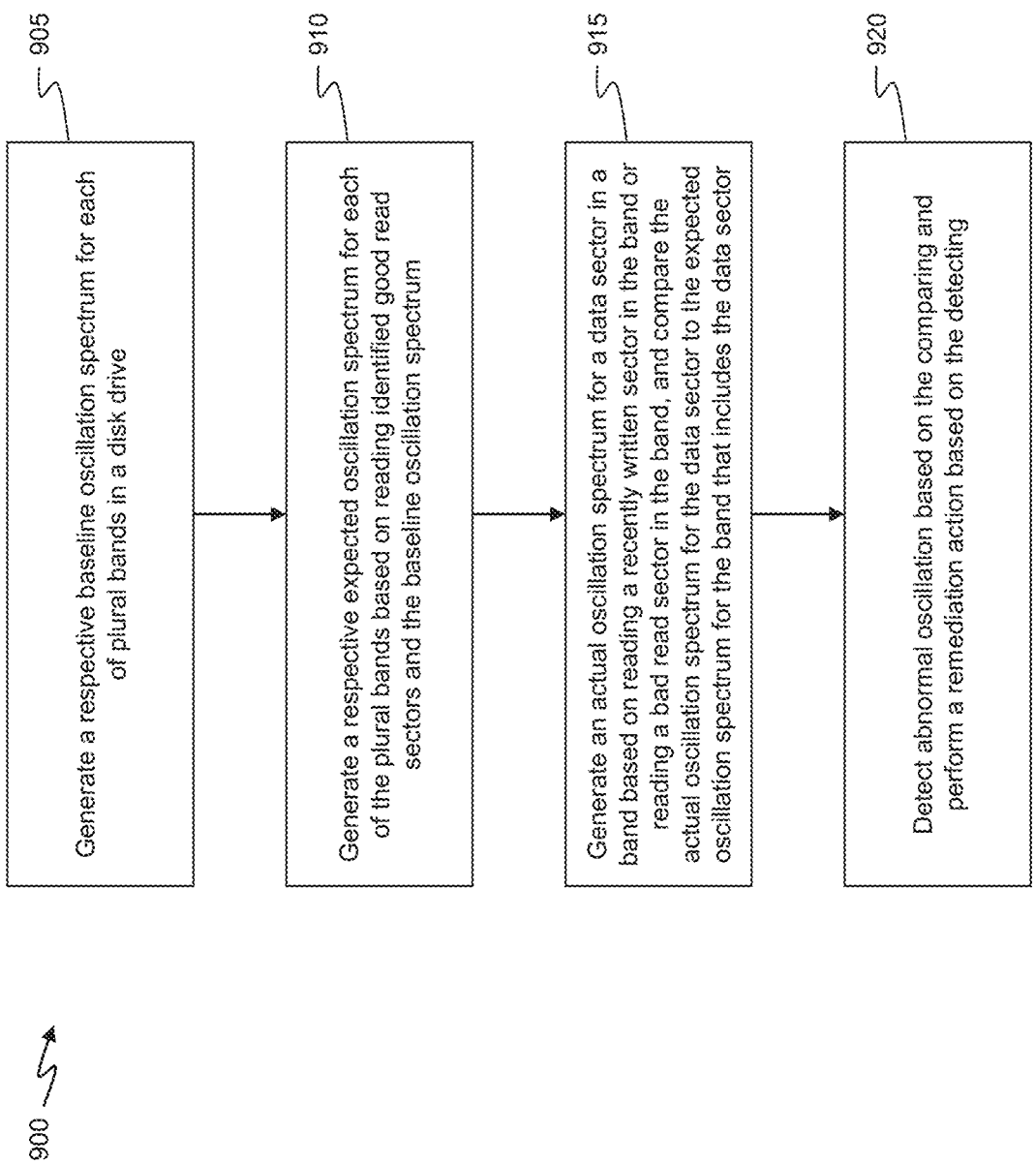
FIG. 9 depicts a flowchart for an example method that control circuitry of a disk drive may perform or execute in controlling the operations of the disk drive, in accordance with aspects of the present disclosure.

FIG. 9 depicts a flowchart for an example method 900 that oscillation detection circuitry 24 of control circuitry 22 may perform or execute in controlling the operations of disk drive 15, in accordance with aspects of the present disclosure, including detecting abnormal vertical oscillation of a head of a disk drive and performing a remediation action in response to such detecting. Operations of the method 900 may be performed in various manners described herein with respect to FIGS. 3-8.

In embodiments, operation 905 includes generating a respective baseline oscillation spectrum for each of plural bands in a disk drive. For example, during manufacturing, the system can generate a baseline spectrum at range of [30 KHz, 100 MHz] for each head/band combination using customer random data. In embodiments, operation 910 includes generating a respective expected oscillation spectrum for each of the plural bands based on reading identified good read sectors and the baseline oscillation spectrum. For example, when the disk drive is in use after manufacturing, and when the disk drive is in idle mode, the system can keep updating the expected spectrum after reading good read sectors (i.e., data sectors in which there is no error recovery needed, have a good error rate, etc.). In embodiments, operation 915 includes generating an actual oscillation spectrum for a data sector in a band based on reading a recently written sector in the band or reading an identified bad read sector in the band, and comparing the actual oscillation spectrum for the data sector to the expected oscillation spectrum for the band that includes the data sector. For example, as another thread in the background tasks, the system can monitor the frequency spectrum on latest reads. In another example, for any sectors that need deep read error recovery or read after write verification, the system collects the spectrum. In embodiments, operation 920 includes detecting abnormal oscillation (i.e., oscillation abnormality) based on the comparing and performing a remediation action based on the detecting. Operations 910, 915, and 920 may be implemented in firmware as backgrounds tasks or in channel hardware to make the oscillation spectrum capture much faster.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface of a selected disk among the one or more disks; and
   one or more processing devices, individually or in combination, configured to:
      generate an expected oscillation spectrum associated with a band of the selected disk;
      detect oscillation abnormality of the selected head based on comparing an actual oscillation spectrum associated with a data sector in the band to the expected oscillation spectrum associated with the band, wherein the data sector includes data written by the selected head; and
      perform a remediation action in response to detecting oscillation abnormality of the selected head.

2. The data storage device of claim 1, wherein the expected oscillation spectrum associated with the band is generated based on a baseline oscillation spectrum associated with the band and output signals of a read element of the selected head.

3. The data storage device of claim 2, wherein the output signals of the read element of the selected head comprise signals generated by the read element when reading data stored in one or more identified good read sectors in the band.

4. The data storage device of claim 3, wherein the one or more processing devices, individually or in combination, are further configured to update the expected oscillation spectrum associated with the band based on reading one or more additional good read sectors in the band.

5. The data storage device of claim 1, wherein:
the band is one of plural bands of the selected disk; and
the one or more processing devices, individually or in combination, are further configured to generate a respective expected oscillation spectrum for each respective one of the plural bands.

6. The data storage device of claim 1, wherein the detecting oscillation abnormality of the selected head comprises determining that a frequency component of the actual oscillation spectrum is greater than a corresponding frequency component of the expected oscillation spectrum by more than a threshold amount.

7. The data storage device of claim 6, wherein the threshold amount comprises a user-configurable value.

8. The data storage device of claim 1, wherein the one or more processing devices, individually or in combination, are further configured to generate the actual oscillation spectrum in response to identifying the data sector as a bad read sector.

9. The data storage device of claim 8, wherein identifying the data sector as a bad read sector comprises determining that a number of error recovery steps used to read the data in the data sector exceeds a threshold number.

10. The data storage device of claim 1, wherein:
the detecting oscillation abnormality of the selected head comprises detecting oscillation abnormality of the selected head at plural data sectors in the band; and
the remediation action includes one of adjusting a fly height of the selected head when the selected head is traveling over the band or reallocating user data from the band to another band.

11. The data storage device of claim 1, wherein:
the one or more processing devices, individually or in combination, are further configured to detect oscillation abnormality of the selected head based on comparing another actual oscillation spectrum associated with another data sector in another band to another expected oscillation spectrum associated with the other band; and
the remediation action includes one of performing a smear removal action on the selected head or performing a head depopulation action on the selected head.

12. The data storage device of claim 1, wherein:
the one or more processing devices, individually or in combination, are further configured to detect oscillation abnormality of another head based on comparing another actual oscillation spectrum associated with another data sector in another band to another expected oscillation spectrum associated with the other band; and
the remediation action includes providing an alert to a user.

13. A method comprising:
generating an expected oscillation spectrum associated with a band of a selected disk in a disk drive;
detecting oscillation abnormality of a selected head in the disk drive based on comparing an actual oscillation spectrum associated with a data sector in the band to the expected oscillation spectrum associated with the band, wherein the data sector includes data written by the selected head; and
performing a remediation action in response to detecting oscillation abnormality of the selected head,
wherein the generating the expected oscillation spectrum, the detecting oscillation abnormality of the selected head, and the performing the remediation action are performed by one or more processing devices individually or in combination.

14. The method of claim 13, further comprising continuously updating the expected oscillation spectrum.

15. The method of claim 13, wherein the band is one of plural bands of the selected disk, and further comprising generating a respective expected oscillation spectrum for each respective one of the plural bands.

16. The method of claim 13, wherein the detecting oscillation abnormality of the selected head comprises determining that a frequency component of the actual oscillation spectrum is greater than a corresponding frequency component of the expected oscillation spectrum by more than a threshold amount.

17. The method of claim 13, wherein the generating the expected oscillation spectrum, the detecting oscillation abnormality of the selected head, and the performing the remediation action are performed in firmware as background tasks of the disk drive.

18. The method of claim 13, wherein the generating the expected oscillation spectrum, the detecting oscillation abnormality of the selected head, and the performing the remediation action are performed in channel hardware in the disk drive.

19. One or more processing devices comprising, individually or in combination:
means for generating and updating an expected oscillation spectrum associated with a band of a selected disk in a disk drive;
means for detecting oscillation abnormality of a selected head in the disk drive based on comparing an actual oscillation spectrum associated with a data sector in the band to the expected oscillation spectrum associated with the band, wherein the data sector includes data written by the selected head; and
means for performing a remediation action in response to detecting oscillation abnormality of the selected head.

20. The one or more processing devices of claim 19, wherein:
the means for detecting oscillation abnormality of the selected head comprises means for determining that a frequency component of the actual oscillation spectrum is greater than a corresponding frequency component of the expected oscillation spectrum by more than a threshold amount; and
the remediation action includes one of: adjusting a fly height of the selected head when the selected head is traveling over the band; reallocating user data from the band to another band; performing a smear removal action on the selected head; performing a head depopulation action on the selected head; or providing an alert to a user.

* * * * *